Figure 1:
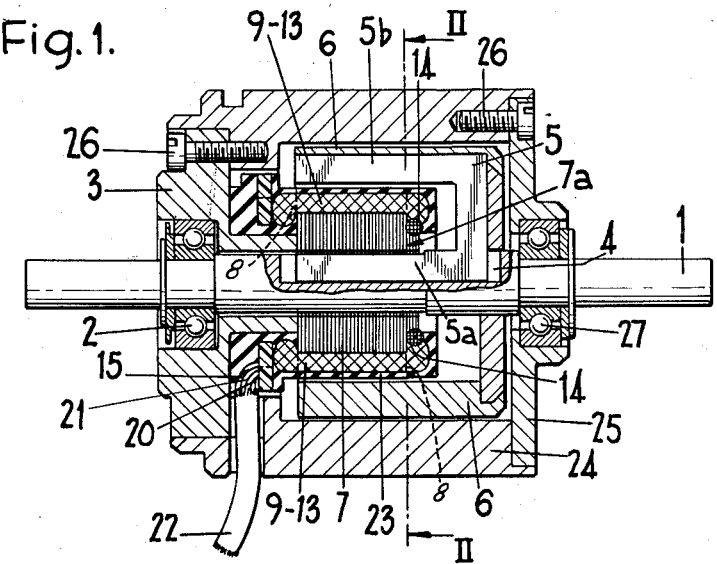

July 30, 1963 C. J. WAYMAN 3,099,830
ELECTRICAL APPARATUS FOR PROVIDING AN INDICATION OF THE
RELATIVE POSITIONS OF RELATIVELY MOVABLE MEANS
Filed April 7, 1958 6 Sheets-Sheet 1

INVENTOR
CECIL JOHN WAYMAN
BY Kirschstein, Kirschstein & Ottinger
ATTORNEYS

United States Patent Office 3,099,830
Patented July 30, 1963

1

3,099,830
ELECTRICAL APPARATUS FOR PROVIDING AN INDICATION OF THE RELATIVE POSITIONS OF RELATIVELY MOVABLE MEANS
Cecil John Wayman, Stanmore, England, assignor to The General Electric Company Limited, London, England
Filed Apr. 7, 1958, Ser. No. 726,863
Claims priority, application Great Britain Apr. 5, 1957
11 Claims. (Cl. 340—347)

The present invention relates to electrical apparatus for providing an indication of the relative positions, at least for relative positions within a predetermined range of such positions, of relatively movable means.

In certain applications it is necessary to provide electrical apparatus from which is derived an electric signal which indicates the relative positions of a pair of relatively movable means. For example, it may be necessary to provide electrical apparatus from which can be derived an electric signal which indicates the relative positions of a first member and a second member, where the first member, for example, a shaft, is adapted for angular displacement relative to the second member, or, alternatively, where the first member is adapted for linear displacement relative to the second member. The electric signal or signals so derived may be utilised, for example, to control electrical machinery or other electrical apparatus, or may be passed to a computer which performs a predetermined computation dependent upon the relative positions of the relatively movable means.

It is an object of the present invention to provide improved electrical apparatus for providing an indication of the relative position, at least for relative positions within a predetermined range of such positions, of relatively movable means.

According to the present invention, in electrical apparatus for providing an indication of the relative positions, at least for relative positions within a predetermined range of such positions, of a pair of relatively movable means, the position of inductive coupling means relative to a plurality of first electrically conductive paths is dependent upon the relative positions of said relatively movable means, so that at any one time the particular combination of said first conductive paths between which and a second conductive path there is at least a predetermined inductive coupling, is characteristic of the particular relative positions of said relatively movable means at that time.

According to a feature of the present invention electrical apparatus for providing an indication of the relative positions, at least for relative positions within a predetermined range of such positions, of a pair of relatively movable means, comprises a plurality of first electrical windings, a second winding, and ferromagnetic coupling means the position of which relative to said first windings is dependent upon the relative positions of said relatively movable means, the apparatus being such that a magnetic circuit extends through that coupling means to link a portion of each of said first windings and said second winding, the sense of the resulting inductive coupling between that first winding and said second winding being dependent upon the position of said coupling means relative to that first winding, so that at any one time the particular combination of said first windings between which and said second winding the inductive coupling is of one predetermined sense, is characteristic of the particular relative positions of said relatively movable means at that time.

Apparatus according to the present invention will now be described, by way of example, with reference to the accompanying drawings in which:

2

Figure 2:
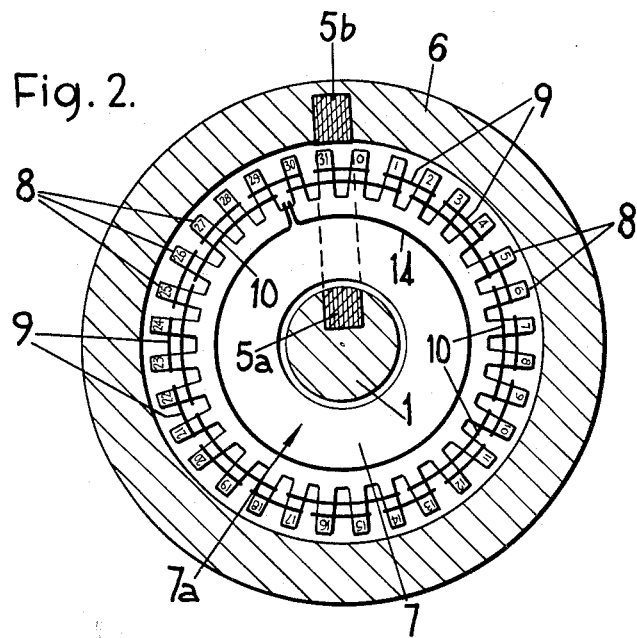
Figure 3A:
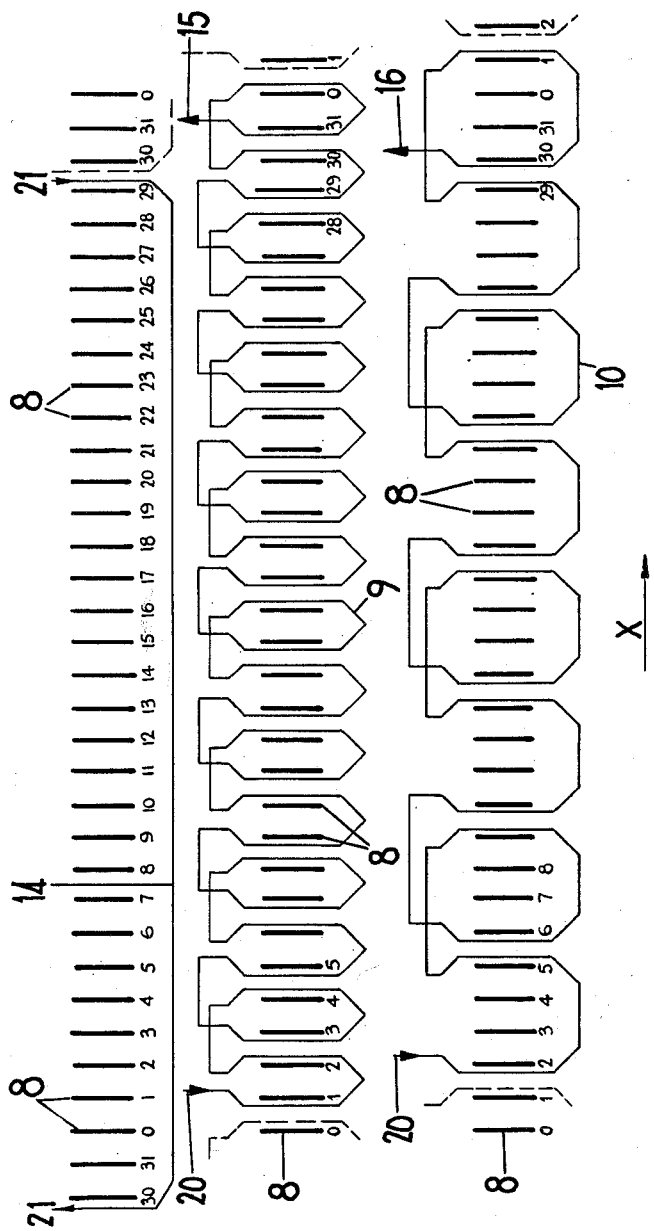
Figure 3B:
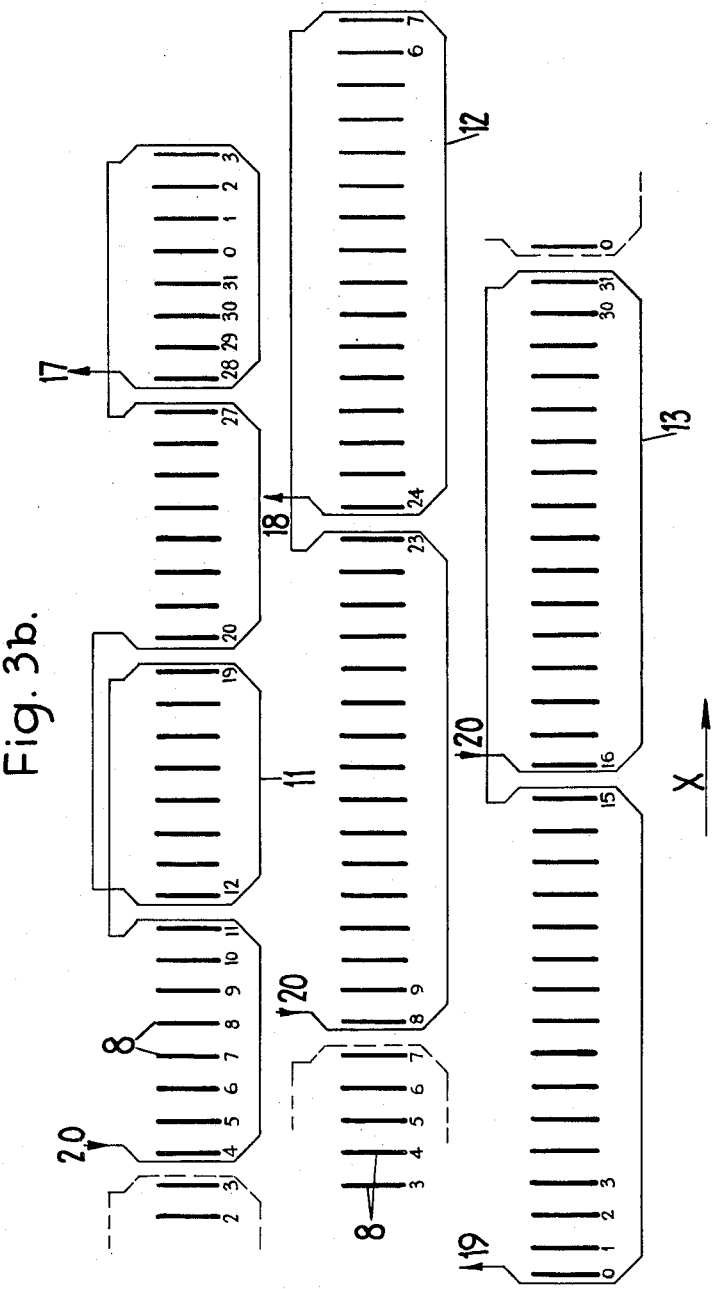
Figure 4:
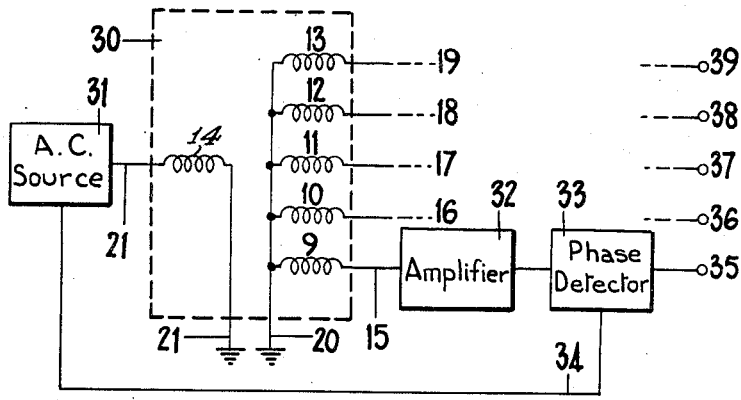
Figure 5:
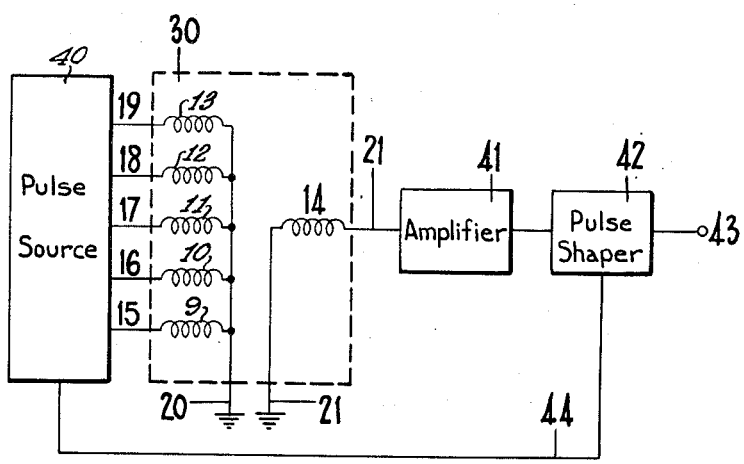
Figure 6:
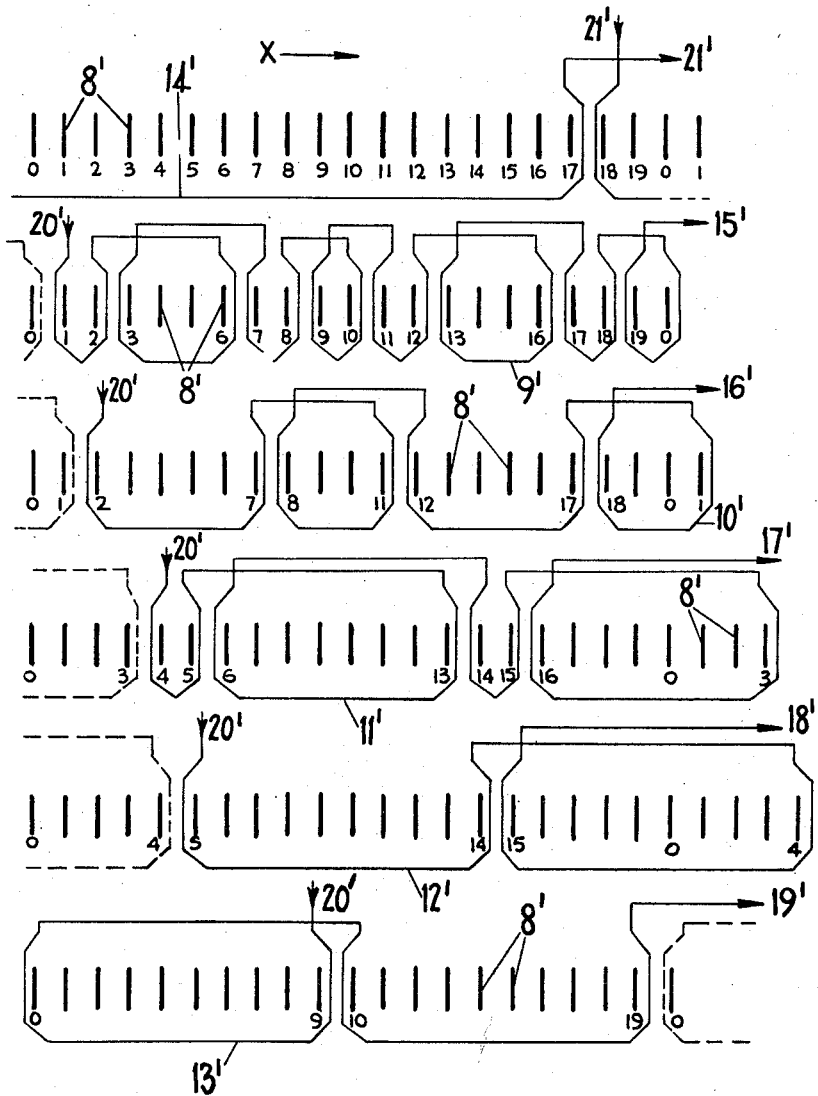
Figure 7:
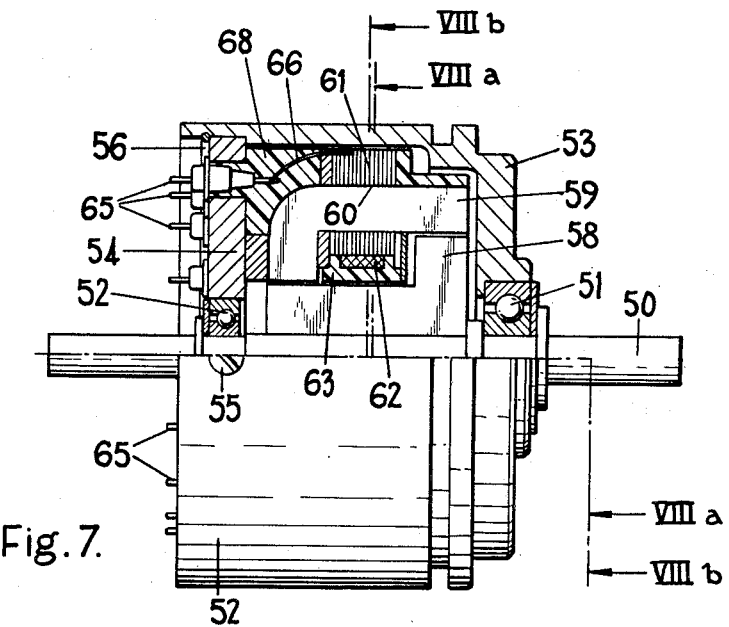
Figure 8:
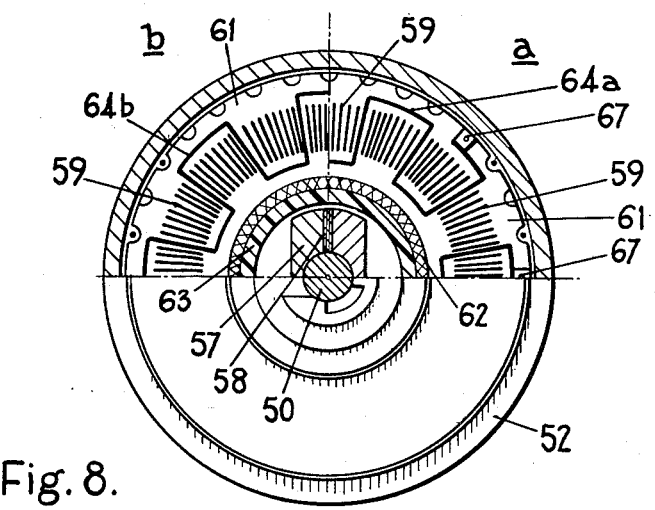

FIGURE 1 is a sectional elevation of one such apparatus;
FIGURE 2 is an enlarged diagrammatic representation of a section taken on the line II—II of FIGURE 1;
FIGURES 3a and 3b are diagrammatic representations of the arrangement of windings in the apparatus of FIGURES 1 and 2;
FIGURES 4 and 5 are circuit arrangements including the apparatus of FIGURES 1 and 2;
FIGURE 6 is a diagrammatic representation of an alternative arrangement of windings in apparatus such as that of FIGURES 1 and 2;
FIGURE 7 is a part sectional elevation of other apparatus according to the present invention; and
FIGURE 8 is a part sectional end elevation of the apparatus of FIGURE 7, the section of the right hand portion of this figure, designated *a*, being taken on the line VIIIa—VIIIa of FIGURE 7, and that of the left-hand portion, designated *b*, being taken on the line VIIIb—VIIIb of FIGURE 7.

Referring to FIGURES 1 and 2, a shaft 1 is journalled within a bearing 2 housed in a stationary member 3. The shaft 1 has a channel 4 therein within which one limb 5a of a laminated ferromagnetic yoke 5 is secured, another limb 5b, and the remainder of the yoke 5, being secured within a cylindrical member 6 which rotates with the shaft 1.

The stationary member 3 has attached thereto a laminated ferromagnetic core 7 having thirty-two teeth 8 (which are numbered 0 to 31 in FIGURES 2, 3a and 3a) the pitch of the teeth 8 being substantially the same as the thickness of the yoke 5. Five windings 9 to 13, which have been given the general reference 9–13 in FIGURE 1, and of which only the windings 9 and 10 are shown for clarity in FIGURE 2, are wound to lie between adjacent ones of the teeth 8 and over the ends of the teeth 8 at the end 7a of the core 7.

A winding 14 is associated with the core 7 at the end 7a, this winding being wound to encircle the shaft 1 at that end of the core 7.

Connection is made to each of the windings 9 to 13 by individual ones of leads 15 to 19 and a common lead 20, connection being made to the winding 14 by a pair of leads 21. The leads 15 to 21 (some only of which are indicated) are enclosed within a protective covering 22.

The manner in which the five windings 9 to 13 are wound onto the core 7 is indicated diagrammatically in FIGURES 3a and 3b. The winding 9 is wound round pairs of the teeth 8; the winding 10 is wound round groups of four of the teeth 8; the winding 11 is wound round groups of eight of the teeth 8; and the windings 12 and 13 are wound round different groups of sixteen of the teeth 8.

It is arranged that the sense in which the windings 9 to 13 are wound onto the core 7 is alternated. For example, the sense in which the winding 9 is wound round Nos. 3 and 4 of the teeth 8 differs from that in which the winding 9 is wound round Nos. 1 and 2 of the teeth 8, whilst the sense in which the winding 9 is wound round Nos. 5 and 6 of the teeth 8, is the same as that in which the winding 9 is wound round Nos. 1 and 2 of the teeth 8. Further, the sense in which the winding 11 is wound round Nos. 12 to 19 of the teeth 8 differs from that in which the winding 11 is wound round Nos. 4 to 11 of the teeth 8, whilst the sense in which the winding 11 is wound round Nos. 20 to 27 of the teeth 8 is the same as that in which the winding 11 is wound round Nos. 4 to 11 of the teeth 8.

It will be assumed for the purposes of the present description that a winding of the windings 9 to 13 is wound in the "positive" sense when the direction in which that winding is wound over the ends of the teeth 8 at the end 7a of the core 7, is in the direction of the arrow X in FIGURES 3a and 3b, whereas that winding will be assumed to be wound in the "negative" sense when the direction in which that winding is wound over the ends of the teeth 8 at the end 7a of the core 7, is opposite to that of the arrow X. The direction in which each of the windings 9 to 13 is wound is indicated by the arrows at the ends of those windings in FIGURES 3a and 3b. For example, the winding 9 is wound over Nos. 1 and 2 of the teeth 8 in the positive sense, over Nos. 3 and 4 of the teeth 8 in the negative sense, and over Nos. 5 and 6 of the teeth 8 in the positive sense. Similarly the winding 11 is wound over Nos. 4 to 11 of the teeth 8 in the positive sense and over Nos. 12 to 19 of the teeth 8 in the negative sense.

The direction in which the winding 14 is wound at the end 7a of the core 7 is indicated by the arrows at the ends of that winding, connection to the winding 14 from the pair of leads 21 being made between Nos. 29 and 30 of the teeth.

The core 7, the windings 9 to 14, and the member 3 are encased within a resin 23, such as one of those sold under the registered trademark "Araldite," in order that the core 7 together with its associated windings is thereby firmly bonded to the member 3.

The apparatus is totally enclosed within a casing formed by the member 3 and members 24 and 25, the members 24 and 25 being bolted to the member 3 by six bolts 26 (of which only two are shown in FIGURE 1). The shaft 1 is journalled wthin a bearing 27 in the member 25.

Although each of the windings 9 to 14 is represented in FIGURES 3a and 3b as a single turn, each of the windings 9 to 13 in actual fact comprises 25 turns, and the winding 14, 50 turns.

It will be assumed for the purposes of the present description that an alternating current exciting signal is applied during operation to the winding 14 from the pair of leads 21.

Neglecting, for the present, the effect of the yoke 5 upon the operation of the apparatus, the application of the alternating current exciting signal to the leads 21 causes alternating currents to be induced in each of the windings 9 to 13, due to normal inductive coupling between each of the windings 9 to 13 and the winding 14 at the end 7a of the core 7. However, due to the fact that the sense of each of the windings 9 to 13 alternates round the end 7a of the core 7, and that there are an equal number of portions thereof which are coupled in each of the senses to the winding 14, the alternating currents induced in each of the windings 9 to 13 in one sense, will be effectively cancelled out by the alternating currents induced therein in the opposite sense. As a result there will be substantially no voltage signals developed between any of the leads 15 to 19, and the common lead 20.

The yoke 5 is shown in FIGURES 1 and 2 in a position relative to the core 7 in which the limb 5b lies over No. 31 of the teeth 8, and in this position therefore, the yoke 5 completes a magnetic circuit linking each of the windings 9 to 13, to the winding 14, where the windings 9 to 13 pass over the end of No. 31 of the teeth 8 at the end 7a of the core 7. This magnetic circuit passes from the limb 5a to the limb 5b through the yoke 5, and from the limb 5b to the limb 5a through that part of the laminated core 7 which lies interposed, in this position, between the limbs 5a and 5b. As a result therefore, the magnitude of the inductive coupling between each of the windings 9 to 13 and the winding 14, where these windings are linked by the yoke 5, will be much greater than is the case for the normal inductive coupling between the windings 9 to 13 and the winding 14, when not so linked. Since the windings 9 to 13 and the winding 14 are only linked by the yoke 5 in the one position, that is, where the windings 9 to 13 lie over the end of No. 31 of the teeth 8 at the end 7a of the core 7, there will only be increased coupling between the windings 9 to 13 and the winding 14 at this one position. As a result, alternating voltage signals appear between each of the leads 15 to 19, and the lead 20, these signals being due solely to the additional inductive coupling between the windings 9 to 13, and the winding 14, where these windings are linked by the yoke 5.

The voltage signals appearing between each of the leads 15 to 19, and the lead 20, will be in-phase or in anti-phase with the alternating current applied between the pair of leads 21, according to the sense of the windings 9 to 13 at the position where these are linked by the yoke 5.

It will be appreciated from FIGURES 3a and 3b that, in the position as shown in FIGURES 1 and 2 where these are linked by the yoke 5, the windings 9 to 12 are each wound in the negative sense whilst the winding 13 is wound in the positive sense. Hence, the alternating voltage signal appearing between each of the leads 15 to 18, and the lead 20, is in anti-phase with the alternating current in the winding 14, whilst the alternating voltage signal appearing between the lead 19 and the lead 20, is in-phase with the alternating current in the winding 14.

The manner in which the windings 9 to 13 are wound over the teeth 8 on the core 7 is such that there is a unique combination of "in-phase" and "in anti-phase" signals between the leads 15 to 19, and the lead 20, for any position of the shaft 1 relative to the member 3. Thus, for any angular position of the shaft 1 within a range of 360 degrees, this position is indicated by the unique combination of "in-phase" and "in anti-phase" signals appearing between the leads 9 to 13, and the lead 20.

Assume, for example, that the shaft 1 is rotated relative to the member 3, to a position in which the yoke 5 links the windings 9 to 13 and the winding 14 where these windings are wound over the end of No. 19 of the teeth 8 at the end 7a of the core 7. In these circumstances the signals appearing between the leads 15 and 17, and the lead 20, are in anti-phase with the alternating current in the winding 14, whilst those appearing between the leads 16, 18 and 19, and the lead 20, are in-phase with this alternating current. This is due to the fact that the windings 9 and 11 are wound in the negative sense, and the windings 10, 12 and 13 in the positive sense, over the end of No. 19 of the teeth 8 at the end 7a of the core 7. The particular combination of "in-phase" and "in anti-phase" siginals appearing in this case between the leads 15 to 19, and the lead 20, provides an indication of this particular angular position of the shaft 1 relative to the member 3, this combination of signals being unique to this position of the yoke 5 relative to the teeth 8.

It will be appreciated that in those angular positions of the shaft 1 for which the limb 5b of the yoke 5 lies partly between two adjacent ones of the teeth 8, the yoke 5 may link the winding 14 to one of the windings 9 to 13 where this latter winding is wound in both senses between those teeth 8. For example, in the case of the angular position of the shaft 1 shown in FIGURES 1 and 2, the limb 5b lies partly between Nos. 31 and 0 of the teeth 8, so that it may be that the limb 5b in this position links each of the windings 9 to 13, to the winding 14, not only where these windings pass over the end of No. 31 of the teeth 8 at the end 7a, but also to a certain extent, where these windings pass over the end of No. 0 of the teeth 8. From reference to FIGURES 3a and 3b, it will be observed that it is only for the winding 13 that there is a change in sense between Nos. 31 and 0 of the teeth 8, hence it may be that an "in anti-phase" signal will be induced in the winding 13 as well as an "in-phase" signal.

In general however, the increase in the magnitude of the inductive coupling between the winding 14 and the winding which changes sense between the two teeth 8, will be greater for that winding where this is wound in one sense, than where wound in the other sense. Hence in general there will be a resultant signal either "in-phase" or "in anti-phase," in this winding. For example it is apparent that in the case of the angular position of the shaft 1 shown in FIGURES 1 and 2, the increase in the magnitude of the coupling between the winding 13 and the winding 14 will be greater for that part thereof which is wound in the positive sense over the end of No. 31 of the teeth 8, than for that part thereof wound in the negative sense over the end of No. 0 of the teeth 8. Thus the resultant signal appearing between the lead 19 and the lead 20 will be an "in-phase" signal.

There is of course one exception to the general proposition set out above, this being when the limb 5b is positioned exactly symmetrically between two adjacent teeth 8. In these circumstances there will be no resultant signal in the winding which changes sense between those teeth; however, as indicated later, these circumstances need not affect to any great extent the accuracy of the apparatus.

One manner in which the signals appearing between the leads 15 to 19 and the lead 20, may be utilised to provide a digital indication of the position of the shaft 1 will now be described with reference to FIGURE 4. The apparatus described above with reference to FIGURES 1, 2, 3a and 3b, is represented in FIGURE 4 as apparatus 30 having windings 9 to 14 and input and output leads 15 to 21, the windings 9 to 14 and the leads 15 to 21 corresponding to the windings and leads of like reference in FIGURES 1, 2, 3a and 3b.

Referring to FIGURE 4, an alternating current source 31 is connected to apply alternating current between one of the leads 21 and earth, the other lead 21 being connected directly to earth. The frequency of alternation of the current thereby applied to the winding 14 is 25 kilocycles per second.

The lead 20 is connected directly to earth, and an amplifier 32 is connected to the lead 15 to amplify any signal appearing between the lead 15 and earth, the amplifier 32 applying the signal so amplified to a phase detector 33. The phase of the signal applied to the phase detector 33 is compared with that of the signal applied to the winding 14, alternating current from the source 31 being applied to the phase detector 33 for such comparison, over a lead 34. If the signal applied to the phase detector 33 by the amplifier 32 is in one of the two phase relationships, in-phase or in anti-phase, with the alternating current applied over the lead 34, a pulse appears at the output terminal 35 of the phase detector 33, but if in the other of these phase relationships, no pulse appears at the output terminal 35. In the present case it is arranged that a pulse appears at the output terminal 35 only if the signal appearing between the lead 15 and earth, is in-phase with the alternating current in the winding 14.

Each of the leads 16 to 19 is similarly connected (but not shown for clarity) to an individual amplifier such as the amplifier 32, and through that amplifier to an individual phase detector such as the phase detector 33. The output terminals of the phase detectors to which the leads 16 to 19 are connected are represented as terminals 36 to 29, respectively. It is arranged that a pulse appears at any one of the output terminals 36 to 39 only when the signal appearing between the corresponding one of the leads 16 to 19, respectively, and earth, is in-phase with the alternating current in the winding 14.

In operation therefore, the position of the shaft 1 relative to the member 3 is indicated by means of a particular combination of pulses appearing at the output terminals 35 to 39, this particular combination being unique for that particular position of the shaft 1.

The appearance of a pulse at any one of the five output terminals 35 to 39 may be taken as representing the binary digit "1," and the absence of such a pulse, the binary digit "0," so that the particular angular position of the shaft 1 is represented in a five digit binary code. The different digits of the binary number representing the angular position of the shaft 1 at any one time, are dependent upon the presence or absence of pulses at the different output terminals 35 to 39 at that time, the five digital positions within the number each corresponding to a different one of the five output terminals 35 to 39.

For example in the case of the angular position of the shaft 1 shown in FIGURES 1 and 2, a pulse appears at the output terminal 39 but not at any of the output terminals 35 to 38. Thus the binary number representing this position of the shaft is:

$$1\ 0\ 0\ 0\ 0$$

the binary digits being arranged here (and also hereinafter) such that reading from right to left, the digits of the binary number represent the presence or absence, as the case may be, of pulses at the terminals 35 to 39 taken in that order.

If the shaft 1 is rotated to the position in which the yoke 5 links the winding 14 to the windings 9 to 13 where these latter windings pass over the end of No. 19 of the teeth 8 at the end 7a of the core 7, the corresponding binary number representative of the position of the shaft 1 is now:

$$1\ 1\ 0\ 1\ 0$$

With the arrangement of windings as shown in FIGURES 3a and 3b the angular position of the shaft 1 relative to the member 3 is represented in a five digit reflected binary cyclic permuted code. Such a code has the advantages that for adjacent "digital" positions of the shaft 1 the binary numbers representative of those two positions differ only in the digit of one digital place.

A "digital" position of the shaft 1 may be defined as the small angular range of position of the shaft 1, of which a single unique binary number, in this case of five digits, is representative. In the present case there are thirty-two such "digital" positions, P0 to P31 say. These "digital" positions P0 to P31 (which are not indicated in the drawings) each extend over a range of 5.625 degrees of rotation of the shaft 1 on either side of the angular position for which the limb 5b is situated symmetrically over the corresponding one of Nos. 0 to 31 of the teeth 8. For example, the shaft 1 is in the "digital" position P31 when situated as shown in FIGURES 1 and 2, the binary number representative of the pulses appearing at the terminals 35 to 39 in this case being the same as if the limb 5b were situated exactly symmetrically over No. 31 of the teeth 8.

The fact, referred to above, that there is a difference in only one digital place between the binary numbers representative of adjacent "digital" positions of the shaft 1, may be illustrated by considering the binary number representative of the "digital" positions P0 and P30 and comparing each of these with the binary number representative of the "digital" position P31. From FIGURES 3a and 3b, the signals appearing in the windings 9 to 13 when the limb 5b is positioned over No. 0 of the teeth 8, that is, when the shaft 1 is in the "digital" position P0, are all "in anti-phase" signals, whilst when the limb 5b is positioned over No. 30 of the teeth 8, that is, when the shaft 1 is in the "digital" position P30, are "in anti-phase" signals in windings 10 to 12 and "in-phase" signals in windings 9 and 13. Hence the binary numbers representative of the "digital" positions P0 and P30 are, respectively:

$$0\ 0\ 0\ 0\ 0\ \text{and}\ 1\ 0\ 0\ 0\ 1$$

Each of these binary numbers differs in only one digital place from the binary number representative of the position of the shaft 1 when in the "digital" position P31 as shown in FIGURES 1 and 2, that is:

$$1\ 0\ 0\ 0\ 0$$

In this manner therefore, any substantial error in the coding of the position of the shaft 1 relative to the member 3, which may occur when the yoke 5 is positioned exactly symmetrically between two adjacent ones of the teeth 8, that is, exactly between consecutive "digital" positions, is obviated. In these circumstances the binary digit which is to occupy the digital place for which there is a change between these consecutive "digital" positions, is indeterminate, and may be indicated therefore, as the binary digit "0" or "1." However, since the binary numbers for these consecutive "digital" positions differ only in this binary digit, the position of the shaft 1 will be indicated as one or the other of these consecutive "digital" positions.

It will be appreciated that where, as in the case of the arrangement shown in FIGURE 4, an amplifier such as the amplifier 32, and a phase detector such as the phase detector 33, are individually allotted to each of the leads 15 to 19, the binary number representative of the position of the shift 1 is obtained in parallel form, pulses representing this position appearing simultaneously at the output terminals 35 to 39. If however, it is desired that this binary number shall be obtained in serial form, the apparatus 30 may be connected in an arrangement as shown in FIGURE 5.

Referring to FIGURE 5, the leads 15 to 19 are connected to a pulse source 40, the lead 20 being connected as in the case of the arrangement of FIGURE 4, directly to earth. One of the leads 21 is connected directly to earth, and the other is connected to an amplifier 41. The amplifier 41 is connected to a pulse-shaper 42 which has an output terminal 43. Pulses from the pulse source 40 are applied to the pulse-shaper 42 over a lead 44.

In operation a train of five pulses is recurrently applied to the apparatus 30 by the pulse source 40 such that different ones of the five pulses are applied between different ones of the leads 15 to 19, and earth. As a result of the application of any such pulse train, a signal is induced in the winding 14, this signal being made up of a series of five separate pulse waveforms which are either of the same polarity as, or of opposite polarity to, the pulses applied to the windings 15 to 19 by the pulse source 40, according to the position of the shaft 1 relative to the member 3 at that time.

The signal appearing in the winding 14 is amplified by the amplifier 41, and is then passed to the pulse-shaper 42. Each of the series of five separate pulse waveforms constituting this signal is suitably shaped by the pulse-shaper 42 and is then, in effect, gated in the pulse-shaper 42 with pulses applied thereto over the lead 44. The pulses applied over the lead 44 have positions in time which are the same as those of the pulses in the pulse train applied to the apparatus 30, the pulse-shaper 42 being such that one of these pulses appears at the output terminal 43 thereof, only if the pulse waveform applied to the pulse-shaper 42 is, for example, of the same polarity as the pulses applied over the lead 44.

It is arranged that the first to fifth pulses of the pulse train applied to the leads 15 to 19 are applied to those leads in that order, so that the sequence of pulses appearing at the output terminal 43 of the pulse-shaper 42 during the period of one such pulse train, is representative of the position of the shaft 1 in serial form, the digits of the binary number representative of the position of the shaft 1 being derived therefore, in ascending order of significance.

It will be appreciated that if it is desired that the digits of this number shall be derived in descending order of significance, then it is only necessary to apply the first to fifth pulses of the pulse train to the leads 15 to 19 in the reverse order.

Although the apparatus described above with reference to FIGURES 1, 2, 3a and 3b, has been described as providing one particular binary coding of the angular position of the shaft 1 relative to the member 3, it will be appreciated that any other binary coding of this angular position is possible by suitable arrangement of the windings 9 to 13 on the core 7. In addition it will be appreciated that the number of teeth 8 provided in the apparatus is dependent upon the particular code used, so that, for example, if it were desired to use a five digit cyclic binary coded decimal code, then it would be necessary to have only twenty such teeth 8 on the core 7, as opposed to the thirty-two teeth in the apparatus described above with reference to FIGURES 1, 2, 3a and 3b.

The manner in which windings such as the windings 9 to 13 might be arranged to provide a five digit cyclic binary coded decimal coding of the position of the shaft 1, will now be described, by way of example, with reference to FIGURE 6. As indicated above it will be necessary in order to provide such coding of the position of the shaft 1, that the core 7 shall be provided with only twenty teeth such as the teeth 8, these teeth, in the present case referenced 8', being numbered 0 to 19 in FIGURE 6. The windings corresponding to the windings 9 to 14 have been referenced 9' to 14' in FIGURE 6.

In FIGURE 6 the convention adopted regarding the sense in which the windings 9' to 14' are wound round the teeth 8', is the same as that adopted in FIGURES 3a and 3b regarding the sense in which the windings 9 to 14 are wound round the teeth 8.

Referring to FIGURE 6, the winding 9' is wound round the pairs of teeth 8' formed by Nos. 1 and 2, 7 and 8, 11 and 12, and 17 and 18, in the positive sense; and is also wound round the pairs of teeth 8' formed by Nos. 9 and 10, and 19 and 0, and the groups of four teeth 8' formed by Nos. 3 to 6, and 13 to 16, in the negative sense.

The winding 10' is wound round the groups of six teeth 8' formed by Nos. 2 to 7, and 12 to 17, in the positive sense; and round the groups of four teeth 8' formed by Nos. 8 to 11, and 18 to 1, in the negative sense.

The winding 11' is wound round the pairs of teeth 8' formed by Nos. 4 and 5, and 14 and 15, in the positive sense; and round the groups of eight teeth 8' formed by Nos. 6 to 13, and 16 to 3, in the negative sense.

The windings 12' and 13' are each wound round two groups of ten teeth 8', the winding 12' being wound round Nos. 5 to 14 in the positive sense, and round Nos. 15 to 4 in the negative sense; whilst the winding 13' is wound round Nos. 0 to 9 in the negative sense, and round Nos. 10 to 19 in the positive sense.

Connection is made to the windings 9' to 13' by leads 15' to 19', respectively, and a common lead 20'; and to the winding 14' by leads 21' passing between Nos. 17 and 18 of the teeth 8'.

The leads 15' to 21' correspond to the leads 15 to 21 shown in FIGURES 3a and 3b, and may be connected in like manner within either of the arrangements described above with reference to FIGURES 4 and 5.

The particular binary number representative in the present case of the position of the shaft 1 for any one of the twenty possible "digital" positions thereof, may be determined from consideration of FIGURE 6. For example, it will be observed from FIGURE 6 that the binary members representative of the position of the shaft 1 when the yoke 5b lies over Nos. 0, 2, 6, 13, 17, and 19 of the teeth 8' are, respectively:

```
0 0 0 0 0
0 0 0 1 1
0 1 0 1 0
1 1 0 1 0
1 0 0 1 1
1 0 0 0 0
``` the binary digits being arranged here such that reading from right to left, the digits of each of these six binary numbers represents the presence ("1") or absence ("0") of an "in-phase" signal between the leads 15' to 19', taken in that order, and the lead 20'.

It will be appreciated that it is not essential to the present invention that the windings (such as the windings 9 to 13) shall be provided, as shown in FIGURES 1, 2, 3a and 3b, by conventional wires wound round teeth (such as the teeth 8) upon a laminated ferromagnetic core (such as the core 7), but that printed circuit techniques may be utilised to provide these windings. In order to illustrate this, an alternative form of apparatus according to the present invention, which embodies printed circuit windings, will now be described with reference to FIGURES 7 and 8.

Referring to FIGURES 7 and 8, a shaft 50 is journalled within a bearing 51 housed in a casing 53, and is also journalled within a bearing 52 in a member 54. The member 54 is secured to the casing 53 by means of a screw 55 and a wire clip 56.

A member 57, of non-ferromagnetic metal, is secured to the shaft 50, the member 57 housing a number of L-shaped ferromagnetic laminations 58, so that the laminations 58 are rotated with the shaft 50 to complete a magnetic circuit (as shown in FIGURE 7) with any one of 128 radially spaced pairs of L-shaped ferromagnetic laminations 59 mounted within the casing 52.

The different pairs of laminations 59 extend through different ones of 128 slots 60 in each of fourteen printed circuit boards 61, the slots 60 of the boards 61 being equally spaced radially around the axis of the shaft 50. The magnetic circuit complete by the laminations 58 links a winding 62, wound upon a former 63, with windings (such as the windings 64a and 64b) printed by normal printed circuit techniques upon the boards 61. Electrical connection is made to the winding 62 and each of the windings such as the windings 64a and 64b, from terminals 65 over conductors such as the conductor 66. Those of these conductors which make connection to the windings printed upon the boards 61, are soldered to tags (such as the tags 67) printed upon those boards.

The laminations 59, the printed boards 61, and the coil former 63, together with the member 54, are cast within a resin 68 such as one of those sold under the registered trademark "Araldite."

As stated above there are fourteen printed boards 61 each having a winding such as the windings 64a and 64b formed thereon, and each winding is so arranged that it follows a tortuous path round the board 61 upon which it is so formed. The path followed by each winding is such that alternate equal positions of that winding lie within and without the laminations 59, so that it is only those portions of that winding which lie within the laminations 59 which may be linked with the winding 62 by the magnetic circuit completed by the laminations 58.

The boards 61 are connected together in pairs, the path followed by the winding on one board of each pair being the inverse of that on the other board of that pair so that portions of the winding on the one board lie without the laminations 59 where corresponding portions of the winding on the other board lie within those laminations, and vice versa. The windings of each pair of boards 61, are connected in series with one another to constitute a single "digit" winding, so that the winding of one board 61 of the pair follows a path in one sense around the axis of the shaft 50, whilst the other winding follows a path in the other sense around that axis. In this manner each of the seven "digit" windings so formed has a portion thereof lying within each of the 128 laminations 59, the sense of each "digit" winding alternating around the axis of the shaft 50.

In the case of the windings 64a and 64b, each of those windings is formed to lie within and without alternate groups of eight pairs of laminations 59, so that the "digit" winding constituted by the windings 64a and 64b is, in effect, wound round groups of eight of the 128 pairs of laminations 59, the sense of this winding alternating between adjacent groups of eight.

It is arranged, similarly, that four of the other six "digit" windings are, in effect, wound round groups of two, four, sixteen and thirty-two respectively, of the 128 pairs of laminations 59, the other two "digit" windings being, in effect, wound round different groups of thirty-two of the pairs of laminations 59. The seven "digit" windings thereby lie round the 128 pairs of laminations 59 to provide a seven digit binary coding of the position of the shaft 50, the arrangement of these seven windings around the 128 pairs of laminations 59 being similar to that of the five windings 9 to 13 around the thirty-two teeth 8 as represented in FIGURES 3a and 3b. As in the case of the windings 9 to 13 the "digit" windings in the present case are arranged to provide a reflected binary cyclic permuted coding, however it will be appreciated that these "digit" windings may be arranged to provide any other desired form of coding, for example a binary coded decimal coding.

The apparatus described above with reference to FIGURES 1 and 2, and also that described with reference to FIGURES 7 and 8, provides an indication of the angular position of a shaft (in the case of FIGURES 1 and 2, the shaft 1, and in the case of FIGURES 7 and 8, the shaft 50) for any such angular positions over a range of 360 degrees. This apparatus however, may be used to provide an indication of the angular position of that shaft over a range greater than 360 degrees if some additional means is provided to indicate the number of complete revolutions (or, alternatively, complete half revolutions) of that shaft, since the indication provided by this additional means then serves to differentiate between the identical signals provided by the apparatus for angular positions of the shaft which differ by 360 degrees or multiples thereof.

For example in the case of the apparatus described above with reference to FIGURES 1 and 2, this additional means may be coupled to the shaft 1 to provide an indication of the number of complete revolutions of that shaft 1 from some datum position thereof. If then this apparatus is connected as the apparatus 30 in the arrangement described above with reference to FIGURE 4, the signals appearing at the terminals 35 to 39 now serve to indicate the position of the shaft 1 within the complete revolution indicated by that additional means.

The series of sixteen four digit binary coded signals appearing at the terminals 35 to 38 for rotation of the shaft 1 through the complete half revolution from the "digital" positions P0 to P15, in that order, are the same as those appearing at those terminals for rotation of the shaft 1 through the other complete half revolution from P16 to P31 taken in the reverse order. The pulse appearing at the terminal 39 while the shaft is within the range of "digital" positions from P16 to P31 merely serves to differentiate between these two half revolutions, no such pulse appearing for positions within the range P0 to P15. It will be apparent therefore, that economy may be obtained in these circumstances by dispensing with the winding 13, or at least with the amplifier (such as the amplifier 32) and the phase detector (such as the phase detector 33) connected between the lead 19 and the terminal 39, if the additional means is arranged to provide an indication of the actual number of complete half revolutions, rather than whole revolutions, of the shaft 1 from the datum position in which the shaft 1 is in the "digital" position P0.

The additional means in these latter circumstances may be provided by further apparatus such as described above with reference to FIGURES 1 and 2, the shaft 1 of the apparatus 30 being coupled to the shaft 1 of this further apparatus by an intermittent coupling so that this latter shaft 1 is stepped-on from one "digital" position to the next, that is 1/32 of a complete revolution thereof, for each complete half revolution of the shaft 1 of the apparatus 30. If the further apparatus is connected in an arrangement such as that shown in FIGURE 4, the signals appearing at the terminals of that arrangement which correspond to the terminals 35 to 39 of FIGURE 4, provide an indication of the number of complete half revolutions of the shaft 1 of the apparatus 30.

The combined output pulse signal from the apparatus 30 and the further apparatus in this manner provides an indication of the angular position of the shaft 1 of the apparatus 30 within any one of sixteen complete revolutions of that shaft, the actual code used to provide this indication being the same cyclic binary code as used in the apparatus 30 itself. That part of this combined signal which is derived from the further apparatus, that is, the combination of the five pulses appearing at the output terminals corresponding to the terminals 35 to 39 of FIGURE 4, indicates in which of the thirty-two half revolutions of the sixteen complete revolutions, the shaft 1 is at that time positioned; and that part derived from the apparatus 30, that is, the four pulses appearing at the terminals 35 to 39 of FIGURE 4, indicates the particular one of the "digital" positions P0 to P15, or P16 to P31 as the case may be, in which the shaft 1 is in fact positioned within that half revolution.

It will be appreciated that if the combined output signal is to be at all times unambiguous it is essential that the shaft 1 of the further apparatus shall be stepped-on in one direction 1/32 of a complete revolution of that shaft for the changeover in the apparatus 30 from the "digital" position P15 to P16 and from the "digital" position P31 to P0; and in the other direction 1/32 of a complete revolution for the changeover from the "digital" position P16 to P15 and from the "digital" position P0 to P31. In addition it is necessary that the actual stepping-on from one "digital" position to the next of the shaft 1 of the further apparatus, shall accompany the actual changeover between the "digital" positions P15 to P16, and P31 and P0, of the shaft 1 of the apparatus 30.

Although apparatus has been described above with reference to FIGURES 1 and 2 and also with reference to FIGURES 7 and 8, for providing an indication of the relative positions of relatively movable means for angular displacements of one means (in the case of FIGURES 1 and 2, the shaft 1; in the case of FIGURES 7 and 8, the shaft 50) relative to the other (in the case of FIGURES 1 and 2, the member 3; in the case of FIGURES 7 and 8, the member 54), it will be appreciated that apparatus according to the present invention may also be constructed for providing an indication of the relative positions of a pair of relatively movable means for linear displacements between those means. For example, such apparatus may be provided by arranging that a yoke similar to the yoke 5 of FIGURES 1 and 2, is moved along a linear path over a plurality of windings, such as the windings 9 to 13 as represented in FIGURES 3a and 3b, in dependence upon the relative linear movement between the pair of movable means, the movement of this yoke varying the position in which these windings are linked with a winding, such as the winding 14 of FIGURES 1 and 2, by the yoke. It will be appreciated that the operation of this latter apparatus will be substantially the same as that of the apparatus described above with reference to FIGURES 1, 2, 3a and 3b.

I claim:

1. Position-encoding apparatus comprising: a plurality of ferromagnetic elements; a plurality of first electrical windings each of which embraces successive groups of said elements in opposite senses in a predetermined pattern, each of which is fixedly mounted with respect to the elements of said group and each of which is electromagnetically coupled to each said element of such group, the coupling of the elements by the different first windings being different, each different element being embraced by a singular combination of different first windings in different senses; a second electrical winding fixedly mounted with respect to said elements and electromagnetically coupled to all of said elements in the same sense thereby to be inductively coupled to said first windings by the different elements; a ferromagnetic yoke to extend from one to the other of opposite ends of any said element to form with the element a substantialy closed ferromagnetic circuit enhancing the inductive coupling between the first and second windings at the respective element; and means mounting said yoke for movement from one to another of said elements to enhance the inductive coupling between the first and second windings, as aforesaid, at the different elements in turn, said electrical windings having terminal means to provide digital conversion of the position of said yoke.

2. Position-encoding apparatus comprising: a ferromagnetic stator having a main body portion and a series of teeth extending from the main body portion; a plurality of first electrical windings each of which embraces successive groups of said teeth in opposite senses in a predetermined pattern, each of which is fixedly mounted with respect to the teeth of said group and each of which is electromagnetically coupled to each of the teeth of such group, the grouping of the teeth by the different first windings being different; a second electrical winding on said stator fixedly mounted with respect to said teeth and electromagnetically coupled to all of said teeth in the same sense thereby to have different portions thereof inductively coupled to said first windings by the different teeth; and a U-shaped ferromagnetic yoke which is mounted for movement selectively to any said tooth, and which includes a first portion lying in close proximity to the selected one of said teeth and a second portion extending from said first portion into correspondingly close proximity with said main body portion of the stator so that said yoke with said main body portion and with the selected tooth forms a substantially closed ferromagnetic circuit enhancing the inductive coupling between the first and second windings at said tooth, said electrical windings having terminal means to provide digital conversion of the position of said yoke.

3. Position-encoding apparatus according to claim 2 wherein the number of teeth in each group is an integral power of two, said integral power being constant for different groups of the same first winding but different for different first windings.

4. Position-encoding apparatus comprising: a cylindrical ferromagnetic stator having an axially-extending central aperture and a plurality of teeth that extend outwardly from the stator around its outer circumference; a plurality of first electrical windings on the stator each of which around the circumference of the stator embraces consecutive groups of the teeth in opposite senses in a predetermined pattern, each of which is fixedly mounted with respect to the teeth of said group and each of which is electromagnetically coupled to each tooth of such group, the grouping of the teeth by the different first windings being different to provide at each tooth a unique combination of first windings wound in one of the senses; a second electrical winding on the stator at one end and embracing said central aperture at said one end, said second winding being fixedly mounted with respect to said teeth and being electromagnetically coupled to all of said teeth in the same sense thereby to be inductively coupled to said first windings by the different teeth; a shaft coaxial with, and rotatable with respect to, the stator; a ferromagnetic member that has two mutually-spaced limbs that extend in the same direction as one another; and means fixedly mounting the ferromagnetic member on the shaft with one of said limbs extending lengthwise into said central aperture from said one end of the stator and lying in close proximity with the stator at said central aperture and with the other limb extending lengthwise of the stator externally thereof and in close proximity to one of said teeth, the particular one depending upon the rotation of the shaft with respect to the stator, so that said member with said stator and with the particular tooth forms a substantially closed ferromagnetic path enhancing the inductive coupling between the first and second windings at the particular tooth, said electrical windings having terminal means to provide digital conversion of the position of said ferromagnetic member.

5. Position-encoding apparatus according to claim 4 including: means to apply a signal of varying instantaneous amplitude to excite the second winding; and a plurality of phase detecting means which are connected to the first windings respectively to detect which of two phase relationships exists between the excitation signal and signals induced in the respective first winding.

6. Position-encoding apparatus comprising: a cylindrical ferromagnetic stator having an axially-extending central aperture and a plurality of spaced ferromagnetic elements disposed around the stator, each said element having one end portion that projects from the stator and another end portion that lies in said aperture; a plurality of first electrical windings each of which around the circumference of the stator embraces consecutive groups of said elements in opposite senses in a predetermined pattern, each of which is fixedly mounted with respect to the elements and each of which is electromagnetically coupled to each said element of such group, the grouping of said elements by the different first windings being different to provide at each said element a unique combination of first windings wound in one of the senses; a second electrical winding on the stator and embracing said central aperture, said second winding being fixedly mounted with respect to said elements and being electromagnetically coupled to all of said elements in the same sense thereby to be inductively coupled to said first windings by the different elements; a shaft coaxial with, and rotatable with respect to, the stator; a ferromagnetic member that has two magnetically-interconnected limbs; and means fixedly mounting the ferromagnetic member on the shaft with one of said limbs extending lengthwise into said central aperture of the stator and with the other limb extending into close proximity with said one end portion of one of said elements, the particular element depending upon the rotation of the shaft with respect to the stator so that said member forms with said stator and with the particular element a substantially closed ferromagnetic circuit enhancing the inductive coupling between the first and second windings at the particular element, said electrical windings having terminal means to provide digital conversion of the position of said ferromagnetic member.

7. Position-encoding apparatus according to claim 6 including: means to apply a signal of varying instantaneous amplitude to excite the second winding; and a plurality of phase detecting means which are connected to the first windings respectively to detect which of two phase relationships exists between the excitation signal and signals induced in the respective first winding.

8. Position-encoding apparatus comprising: a cylindrical ferromagnetic stator having an axially-extending central aperture and a plurality of teeth that extend outwardly from the stator around its outer circumference; a plurality of first electrical windings on the stator each of which around the circumference of the stator embraces consecutive groups of the teeth in opposite senses in a predetermined pattern, each of which is fixedly mounted with respect to the teeth of said group and each of which is electromagnetically coupled to each said tooth, the grouping of the teeth by the different first windings being different to provide at each tooth a unique combination of first windings wound in one of the senses; a second electrical winding on the stator at one end and embracing said central aperture at said one end, said second winding being fixedly mounted with respect to said teeth and being electromagnetically coupled to all of said teeth in the same sense thereby to be inductively coupled to said first windings by the different teeth; a ferromagnetic member that has two mutually-spaced limbs that extend in the same direction as one another; means mounting said ferromagnetic member for rotation relative to the stator and with one of the limbs extending into the central aperture at said one end and the other limb extending externally of the stator in close proximity to one of said teeth, the particular one of said teeth depending upon the rotation of said ferromagnetic member relative to the stator so that said member forms with said stator and with the particular tooth a substantially closed ferromagnetic path enhancing the inductive coupling between the first and second windings at the respective teeth; means to apply an electric excitation signal of varying amplitude to the first windings in turn; and means responsive to the polarity of each individual signal induced in said second winding whereby to provide digital conversion of the position of said ferromagnetic member.

9. Position-encoding apparatus comprising: an annular ferromagnetic stator having teeth extending outwardly therefrom around its outer circumference; a plurality of first electrical windings on the stator each of which around the circumference of the stator embraces consecutive groups of teeth in opposite senses in a predetermined pattern, each of which is fixedly mounted with respect to the teeth of said group and each of which is electromagnetically coupled to each said tooth of such group, the grouping of the teeth for the different first windings being different thereby to provide at each tooth a unique combinatiaon of first windings wound in one of the senses; means to excite electrically the first windings in turn; a shaft that is rotatably mounted coaxial with the stator; a ferromagnetic member having two mutually-spaced limbs that extend in the same direction as one another; means fixedly mounting the ferromagnetic member on the shaft with one of said limbs extending lengthwise along the shaft internally of said stator and lying in close proximity with the stator at the inner periphery thereof and the other limb extending externally of said stator into close proximity with one of said teeth, the particular tooth depending upon the rotation of the shaft relative to the stator; a second electrical winding for responding to magnetic flux induced in said one limb from excitation of said first windings; and means mounting said second winding on said stator to embrace said one limb, said second winding being fixedly mounted with respect to said teeth and being electromagnetically coupled to all of said teeth in the same sense thereby to be inductively coupled to said first windings by the different teeth, said ferromagnetic member forming with said stator and with the particular tooth a substantially closed ferromagnetic path enhancing the inductive coupling between the first and second windings at the particular tooth, said second electrical winding having terminal means to provide digital conversion of the position of said ferromagnetic member.

10. Position-encoding apparatus comprising: a plurality of ferromagnetic elements; a plurality of first electrical windings each of which embraces at least one group of said elements all in the same sense, each of which is fixedly mounted with respect to the elements of said group and each of which is electromagnetically coupled to each said element of such group, each grouping of said elements by the different first windings being different; a second electrical winding fixedly mounted with resepect to said elements and electromagnetically coupled to each said element thereby to be inductively coupled to said first windings by the different elements; a ferromagnetic yoke to extend from one to the other of opposite ends of any said element to form with the element a substantially closed ferromagnetic circuit enhancing the inductive coupling between the first and second windings at the respective element; and means mounting said yoke for movement from one to another of said elements to enhance the inductive coupling between the first and second windings, as aforesaid, at the different elements in turn, said electrical windings having terminal means to provide digital conversion of the position of said yoke.

11. Position-encoding apparatus comprising: a plurality of ferromagnetic elements; a plurality of first electrical windings each of which embraces at least one group of said elements all in the same sense, each of which is fixedly mounted with respect to the elements of said groups and each of which is electromagnetically coupled to each said element of such group, each grouping of said elements by the different first windings being different; a second electrical winding fixedly mounted with respect to said elements and electromagnetically coupled to each said element thereby to be inductively coupled to said first windings by the different elements; a ferromagnetic yoke to extend from one to the other of opposite ends of any said element to form with the element a substantially closed ferromagnetic circuit enhancing the inductive coupling between the first and second windings at the respective element; means mounting said yoke for movement from one to another of said elements to enhance the inductive coupling between the first and second windings, as aforesaid, at the different elements in turn; and means for applying electric pulses to the said first windings in turn, said second electrical winding having terminal means to provide digital conversion of the position of said yoke.

References Cited in the file of this patent

UNITED STATES PATENTS

| | | |
|---|---|---|
| 2,650,352 | Childs | Aug. 25, 1953 |
| 2,669,126 | Simmons | Feb. 16, 1954 |
| 2,847,664 | Lewis | Aug. 12, 1958 |
| 2,911,632 | Levine et al. | Nov. 3, 1959 |
| 2,931,023 | Quade | Mar. 29, 1960 |